(12) United States Patent
Fukuchi

(10) Patent No.: US 9,743,052 B2
(45) Date of Patent: Aug. 22, 2017

(54) PROJECTOR, MULTI-PROJECTION SYSTEM, AND METHOD FOR CONTROLLING PROJECTOR

(71) Applicant: SEIKO EPSON CORPORATION, Tokyo (JP)

(72) Inventor: Hideo Fukuchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 14/277,520

(22) Filed: May 14, 2014

(65) Prior Publication Data

US 2014/0347497 A1    Nov. 27, 2014

(30) Foreign Application Priority Data

May 21, 2013  (JP) .................................. 2013-106929

(51) Int. Cl.
  *G03B 21/14*  (2006.01)
  *H04N 9/31*  (2006.01)

(52) U.S. Cl.
  CPC ................................ *H04N 9/3147* (2013.01)

(58) Field of Classification Search
  CPC ..... G03B 37/04; H04N 9/3194; H04N 9/3147
  USPC .......................................................... 353/94
  See application file for complete search history.

(56) References Cited

U.S. PATENT DOCUMENTS

| 2006/0181685 | A1* | 8/2006 | Hasegawa | G03B 37/04 |
| | | | | 353/69 |
| 2010/0171930 | A1 | 7/2010 | Kurosawa | |
| 2012/0050698 | A1* | 3/2012 | Kotani | G03B 21/14 |
| | | | | 353/94 |
| 2013/0222386 | A1* | 8/2013 | Tannhauser | G06T 3/4038 |
| | | | | 345/428 |

FOREIGN PATENT DOCUMENTS

| JP | 2009-086485 A | 4/2009 | |
| JP | 2010-160270 A | 7/2010 | |
| JP | 2012-083572 | * 4/2012 | .............. G09G 5/00 |
| JP | A-2012-83572 | 4/2012 | |

* cited by examiner

*Primary Examiner* — Steven H Whitesell Gordon
*Assistant Examiner* — Jerry Brooks
(74) *Attorney, Agent, or Firm* — Oliff PLC

(57) ABSTRACT

A projector that projects an image includes a communication section that sends a projection request command that requests another projector connected to the projector to project a test image, an imaging section that captures an image of the test image projected in response to the projection request command by the another projector, and a layout recognition section that recognizes a relative layout relationship between the projector and the another projector based on the image captured by the imaging section.

9 Claims, 15 Drawing Sheets

LAYOUT INFORMATION DATABASE (INITIALIZED STATE)

DB0(DB)

| PROJECTOR ID | DISPLAY PIXEL COUNT | RELATIVE POSITION |
|---|---|---|
| ID0 | 1920 × 1080 | |
| ID1 | 1920 × 1080 | |

LAYOUT INFORMATION DATABASE (INITIALIZED STATE)

DB0(DB)

| PROJECTOR ID | DISPLAY PIXEL COUNT | RELATIVE POSITION |
|---|---|---|
| ID0 | 1920 × 1080 | |
| ID1 | 1920 × 1080 | |

LAYOUT INFORMATION DATABASE (COMPLETE STATE)

DB1(DB)

| PROJECTOR ID | DISPLAY PIXEL COUNT | RELATIVE POSITION |
|---|---|---|
| ID0 | 1920 × 1080 | (0, 0) |
| ID1 | 1920 × 1080 | (0, −1) |

TEST IMAGE

LAYOUT INFORMATION DATABASE (COMPLETE STATE)

DB2(DB)

| PROJECTOR ID | DISPLAY PIXEL COUNT | RELATIVE POSITION |
|---|---|---|
| ID0 | 1920 × 1080 | (0, 0) |
| ID1 | 1920 × 1080 | (-1, 0) |

FIG. 13

LAYOUT INFORMATION DATABASE (COMPLETE STATE)

DB3(DB)

| PROJECTOR ID | DISPLAY PIXEL COUNT | RELATIVE POSITION |
|---|---|---|
| ID0 | 1920 × 1080 | (0, 0) |
| ID1 | 1920 × 1080 | (0, -1) |
| ID2 | 1920 × 1080 | (-1, 0) |
| ID3 | 1920 × 1080 | (-1, -1) |

FIG. 16

PROJECTOR, MULTI-PROJECTION SYSTEM, AND METHOD FOR CONTROLLING PROJECTOR

The entire disclosure of Japanese Patent Application No. 2013-106929, filed May 21, 2013, is expressly incorporated by reference herein.

BACKGROUND

1. Technical Field

The present invention relates to a projector, a multi-projection system, and a method for controlling the projector.

2. Related Art

There is a known display system that performs multiple display operation in which a single image inputted from an external apparatus is divided into a plurality of images and a plurality of display apparatus (projectors) display the plurality of divided images as a single image (multi-projection system). In a display system of this type, a master display apparatus acquires a maximum display pixel count from each of a plurality of slave display apparatus, calculates a maximum display pixel count of a displayable image in the multiple display operation based on the acquired maximum display pixel counts, stores the calculated maximum display pixel count, and transmits it to the external apparatus (PC) (JP-A-2012-83572, for example).

In the thus configured multi-projection system (display system), divided images projected from the plurality of projectors are combined with one another and the resultant single image is displayed. In the aspect in which a plurality of projectors are arranged in the form of a row and/or a column for image projection, however, each of the projectors cannot recognize the relative layout relationship between the projector and the other projectors. Each of the projectors cannot therefore determine which portion (range) of an input image (entire image) the projector is responsible for in image projection operation in some cases.

SUMMARY

An advantage of some aspects of the invention is to solve at least a part of the problems described above, and the invention can be implemented as the following forms or application examples.

Application Example 1

This application example is directed to a projector that projects an image, the projector including a communication section that sends a projection request command that requests another projector connected to the projector to project a test image, an imaging section that captures an image of the test image projected in response to the projection request command by the another projector, and a layout recognition section that recognizes a relative layout relationship between the projector and the another projector based on the image captured by the imaging section.

According to the projector described above, the communication section sends the test image projection request command to another projector connected to the projector. The imaging section captures an image of the test image projected by the another projector. The layout recognition section recognizes the layout relationship between the projector and the another projector based on the captured image. The projector can therefore recognize the layout of the another projector with respect to the projector and figure out a projection region for which the projector is responsible.

Application Example 2

This application example is directed to the projector according to the application example described above, which further includes a layout information creation section that creates layout information representing the relative layout relationship between the projector and the another projector based on the layout relationship recognized by the layout recognition section.

According to the projector described above, the layout information creation section creates layout information representing the relative layout relationship between the projector and the another projector. The projector can therefore handle the layout relationship between the projector and the another projector as information.

Application Example 3

This application example is directed to the projector according to the application example described above, wherein the communication section sends the layout information created by the layout information creation section to the another projector.

According to the projector described above, the communication section sends the layout information to the another projector. A plurality of projectors can therefore share the layout information. The another projector can also figure out a projection region for which the another projector is responsible.

Application Example 4

This application example is directed to the projector according to the application example described above, which further includes a pixel count storage section that stores first display pixel count information representing the count of pixels displayed by the projector and a total display pixel count calculation section that calculates total display pixel count information representing the count of pixels displayed in an entire image formed by the projector and the another projector, wherein the communication section receives second display pixel count information representing the count of pixels displayed by the another projector from the another projector, and the total display pixel count calculation section calculates the total display pixel count information based on the first display pixel count information, the second display pixel count information, and the layout information.

According to the projector described above, the pixel count storage section stores first display pixel count information representing the count of pixels displayed by the projector. The total display pixel count calculation section calculates total display pixel count information representing the count of pixels displayed in an entire image formed by arranging images projected by the projector and the another projector in the form of a row or a column. The communication section receives second display pixel count information representing the count of pixels displayed by the another projector, and the total display pixel count calculation section calculates the total display pixel count information based on the first display pixel count information, the second display pixel count information, and the layout information. The projector can therefore recognize the total display pixel count information on the total count of pixels displayed in an image formed by arranging projected images in the form of a row or a column.

Application Example 5

This application example is directed to the projector according to the application example described above, which further includes a total display pixel count storage section that stores the layout information and the total display pixel count information, and the total display pixel count storage section may be configured to be referred to from an apparatus outside the projector.

According to the projector described above, the total display pixel count storage section stores the layout information and the total display pixel count information. The total display pixel count storage section is configured to be externally referred to. An external image supply apparatus connected to the projector can therefore refer to the layout information and the total display pixel count information stored in the total display pixel count storage section to supply the projector with image information.

Application Example 6

This application example is directed to the projector according to the application example described above, which further includes a test image projection control section that control the projector to project the test image in response to the projection request command in a case where the communication section receives the projection request command.

According to the projector described above, the test image projection control section controls the projector to project the test image in response to the projection request command. The projector, even when it receives the projection request command from the another projector, can therefore respond to the request.

Application Example 7

This application example is directed to a multi-projection system including the projector according to the application example described above and the another projector.

According to the multi-projection system described above, in an aspect in which projectors are horizontally arranged side by side or vertically stacked on each other, the layout relationship among the projectors can be recognized.

Application Example 8

This application example is directed to a method for controlling a projector that projects an image, the method including sending a projection request command that requests another projector connected to the projector to project a test image, capturing an image of the test image projected in response to the projection request command by the another projector, and recognizing a relative layout relationship between the projector and the another projector based on the image captured in the capturing.

According to the method for controlling a projector described above, the projector can recognize the layout of the another projector with respect to the projector and figure out a projection region for which the projector is responsible.

When the projector and the method for controlling the projector described above are achieved by using a computer provided in the projector, the forms and the application examples described above can be provided in an aspect of a program that achieves the functions of the projector and the method for controlling the projector, in an aspect of a recording medium on which the program is recorded in a computer readable manner, or in any other aspect. Examples of the recording medium may include a flexible disk, an HDD (hard disk drive), a CD-ROM (compact disk read only memory), a DVD (digital versatile disk), a Blu-ray (registered trademark) disc, a magneto-optical disk, a nonvolatile memory card, an internal storage device in the projector (RAM (random access memory), ROM (read only memory), or any other semiconductor memory), an external storage device (such as USB (universal serial bus) memory), and a variety of other media that can be read by the computer.

BRIEF DESCRIPTION OF THE DRAWINGS

The invention will be described with reference to the accompanying drawings, wherein like numbers reference like elements.

FIG. 4A is a descriptive diagram showing an initialized state, and FIG. 4B is a descriptive diagram showing a complete state.

FIG. 7A is a descriptive diagram of the test image, and FIG. 7B is a descriptive diagram of the imaging result.

FIG. 12A is a descriptive diagram of a result of imaging of a test image projected by a master projector, and FIG. 12B is a descriptive diagram of a result of imaging of a test image projected by a slave projector.

FIG. 13 is a descriptive diagram of a layout information database according to Example 2.

FIG. 15A is a descriptive diagram of a result of imaging of a test image projected by a slave projector. FIG. 15B is a descriptive diagram of a result of imaging of a test image projected by another slave projector. FIG. 15C is a descriptive diagram of a result of imaging of a test image projected by still another slave projector.

FIG. 16 is a descriptive diagram of a layout information database according to Example 3.

DESCRIPTION OF EXEMPLARY EMBODIMENTS

Embodiment

As an embodiment of the invention, a description will be made of a projector that modulates light emitted from a light source based on image information to form image light and projects the image light on an external screen or any other surface and a multi-projection system that uses the projector at a plurality of locations to perform multiple display operation with reference to the drawings.

Figure 1:
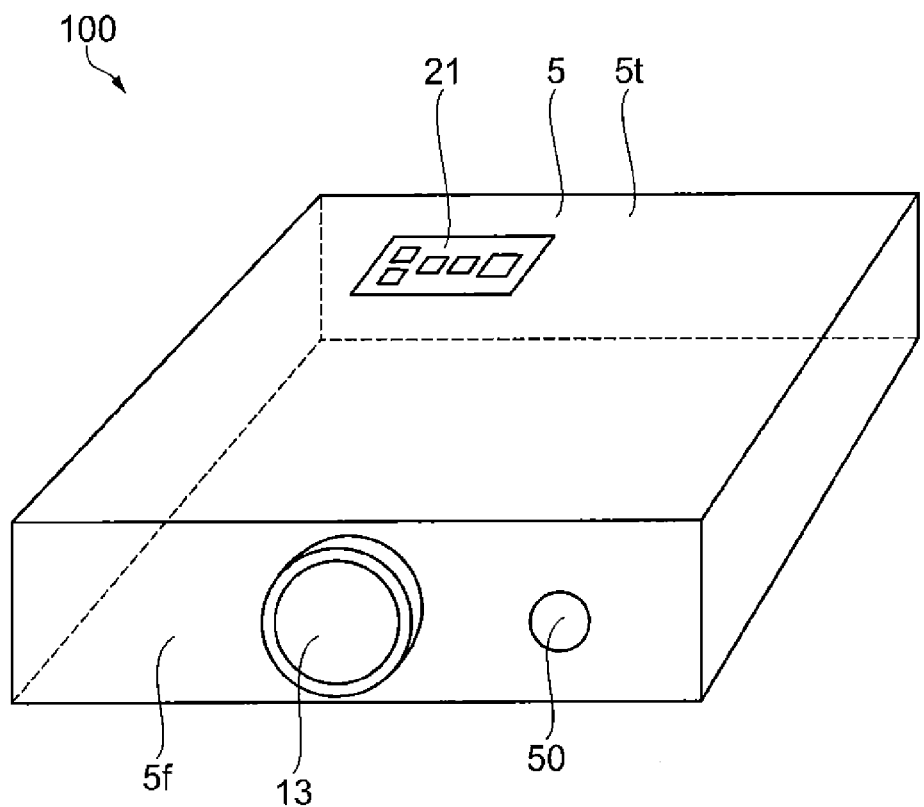
FIG. 1 is a perspective view of a projector.

FIG. 1 is a perspective view of a projector according to the present embodiment.

A projector 100 includes an enclosure 5, which accommodates an apparatus body, and an operation panel 21, through which a user performs input operation, is provided on an upper surface 5t of the enclosure 5, as shown in FIG. 1.

A projection lens 13 is exposed through a front surface 5f of the enclosure 5, and the projection lens 13 projects an image based on image information on a projection surface (not shown in FIG. 1) in front of the projector 100. Further, an imaging section 50 is provided in a position in the vicinity of the projection lens 13, and the imaging section 50 captures an image of part of the projection surface including the image projected thereon.

Figure 2:
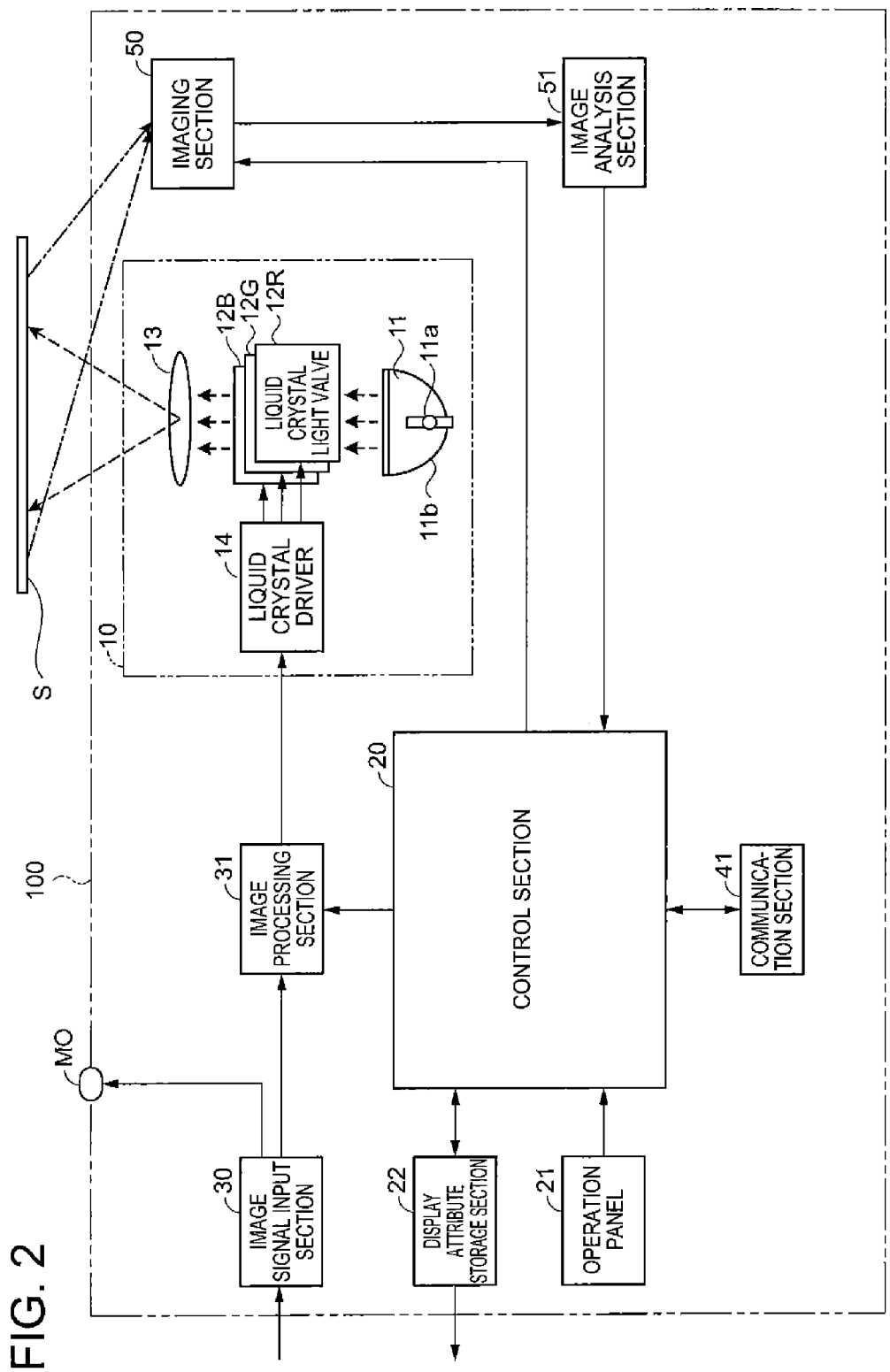
FIG. 2 is a block diagram showing a schematic configuration of the projector.

FIG. 2 is a block diagram showing a schematic configuration of the projector 100.

The projector 100 includes an image projection section 10, a control section 20, the operation panel 21, a display attribute storage section 22, an image signal input section 30, an image processing section 31, a communication section 41, the imaging section 50, and, an image analysis section 51, which are accommodated in the enclosure 5, as shown in FIG. 2. The projector 100 further includes an image signal output terminal MO.

The image projection section 10 is formed, for example, of a light source apparatus 11 as a light source, three liquid crystal light valves 12R, 12G, and 12B as light modulators, the projection lens 13 as a projection system, and a liquid crystal driver 14. The image projection section 10 corresponds to a display section, and the liquid crystal light valves 12R, 12G, and 12B modulate light outputted from the light source apparatus 11 into image light, which is then projected through the projection lens 13 and an image is displayed on a projection surface S.

The light source apparatus 11 includes a discharge-type light source lamp 11a, which is formed, for example, of an ultrahigh-pressure mercury lamp or a metal halide lamp, and a reflector 11b, which reflects light emitted from the light source lamp 11a toward the liquid crystal light valves 12R, 12G, and 12B. The light outputted from the light source apparatus 11 is converted by an optical integration system (not shown) into light having a substantially uniform luminance distribution, and the resultant light is separated by a color separation system (not shown) into the following color light components: red (R), green (G), and blue (B), which are the three primary colors of light. The R, G, and B color light components are then incident on the liquid crystal light valves 12R, 12G, and 12B, respectively.

Each of the liquid crystal light valves 12R, 12G, and 12B is formed, for example, of a liquid crystal panel having a liquid crystal material sealed between a pair of transparent substrates. Each of the liquid crystal light valves 12R, 12G, and 12B has a rectangular pixel region where a plurality of pixels (not shown) are arranged in a matrix, and a drive voltage is applicable to the liquid crystal material on a pixel basis. When the liquid crystal driver 14 applies a drive voltage according to inputted image information to each of the pixels, the optical transmittance of the pixel is set in accordance with the image information. As a result, the light outputted from the light source apparatus 11 is modulated when passing through the pixel regions of the liquid crystal light valves 12R, 12G, and 12B, and image light according to the image information is formed on a color light basis. The thus formed color image light fluxes are combined with one another by a light combining system (not shown) on a pixel basis into color image light, which is then enlarged and projected through the projection lens 13.

The control section 20 includes a CPU (central processing unit), a RAM used to temporarily store a variety of data and other pieces of information, and a nonvolatile ROM, and the CPU operates in accordance with a control program stored in the ROM to oversee and control the action of the projector 100.

The operation panel 21 corresponds to an operation reception section that receives user's key operation and includes a plurality of operation keys that the user uses to issue a variety of instructions to the projector 100. The operation keys provided on the operation panel 21 of the present embodiment include a power supply key for alternately switching the state of the power supply between on and off, an input switch key for switching an inputted image signal to another, a menu key for displaying a menu image the allows the user to make a variety of settings, arrow keys used to select or otherwise specify an item in the menu image, a return key for finalizing a selected item, and a multi-projection key used to search another projector connected to the projector 100 when the projector 100 is used as part of a multi-projection system and produce layout information.

When the user operates any of the variety of operation keys on the operation panel 21, the operation panel 21 receives the operation and outputs a control signal corresponding to the operated operation key to the control section 20. The control section 20, to which the control signal is inputted from the operation panel 21, carries out a process based on the inputted control signal to control the action of the projector 100. In place of or in addition to the operation panel 21, a remotely operable remote control (not shown) may be used as an input operation section. In this case, the remote control sends, for example, an infrared operation signal according to the user's operation, and a remote control signal receiver (not shown) receives the operation signal and transmits it to the control section 20.

The display attribute storage section 22 has a nonvolatile memory and stores display attribute information corresponding to EDID (extended display identification data). Specifically, when the projector 100 is incorporated in a multi-projection system, the display attribute storage section 22 stores, for example, total display pixel count information representing the total count of displayable pixels in the multi-projection system, layout information representing the relative layout relationship among the projectors, and display pixel count information representing the count of the pixels displayed by the projector 100. The display attribute storage section 22 that operates as described above corresponds to a total pixel count storage section and a pixel count storage section. When the projector is used on a standalone basis, the display attribute storage section 22 stores, for example, the display pixel count information associated with the projector 100.

Writing any of the types of information described above to the display attribute storage section 22 is performed by the control section 20. To supply an image signal to the projector 100, an external image supply apparatus (not shown) connected to the projector 100 via an image cable (not shown) can read (acquire) the information described above from the display attribute storage section 22 via the image cable. Specifically, when a state in which the image cable is disconnected from the projector 100 is changed to a state in which the image cable is connected to the projector 100, the image supply apparatus acquires the display attribute information associated with the projector 100 from the display attribute storage section 22 via the image cable. Since the image supply apparatus and the projector 100 work this way, the image supply apparatus can acquire the display attribute information again by creating a state of the projector 100 equivalent to a state in which the image cable is disconnected therefrom and then changing the state back to the state in which the image cable is connected to the projector 100.

The image signal input section 30 has a plurality of input terminals to which image signals in a variety of formats are inputted from the external image supply apparatus, such as a video reproducing apparatus and a personal computer. The image signal input section 30 outputs image information based on any of the inputted image signals to the image processing section 31. The image signal input section 30 further outputs the inputted image signal through the image signal output terminal MO. When the projector 100 is incorporated in and used part of a multi-projection system, the image signal outputted through the image signal output terminal MO is inputted to another projector.

The image processing section 31 converts the image information inputted from the image signal input-section 30 into image information representing the grayscale of each of the pixels in the liquid crystal light valves 12R, 12G, and 12B, that is, image information for defining the drive voltage applied to each of the pixels. The image processing section 31 further performs image processing based on an instruction from the control section 20. The image processing used herein refers to image processing performed on the image information, such as image scaling, trapezoidal distortion correction, and adjustment of displayed image states (for example, brightness, contrast, synchronization, tracking, color depth, and tint). The image processing section 31 can further superimpose the menu image or any other OSD (on-screen display) image over an inputted image. The image information having undergone the image processing performed by the image processing section 31 is outputted to the liquid crystal driver 14.

The liquid crystal driver 14 drives the liquid crystal light valves 12R, 12G, and 12B in accordance with the image information inputted from the image processing section 31. As a result, the light outputted from the light source apparatus 11 is modulated by the liquid crystal light valves 12R, 12G, and 12B in accordance with the image information and projected through the projection lens 13.

The communication section 41 has a transmitter and a receiver (neither of them are shown) and communicates with another projector based on an instruction from the control section 20. The communication section 41 uses a predetermined communication device to communicate with another projector. In the present embodiment, communication using the predetermined communication device is assumed to be USB-cable-based communication. As an exemplary aspect of connection using a USB cable, the A terminal of a USB connector of the projector 100 is connected to the B terminal of a USB connector of another projector. To connect still another projector, the A terminal of the USB connector of the another projector described above is connected to the B terminal of a USB connector of the still another projector. Using the A and B terminals of a USB connector thus allows a plurality of projectors to be serially connected to each other for communication. The communication device used by the communication section 41 is not necessarily a USB-based device and may be another communication device (such as wireless communication device).

The imaging section 50 includes an imaging device (not shown) formed, for example, of a CCD (charge coupled device) sensor or a CMOS (complementary metal oxide semiconductor) sensor and an imaging lens (not shown) that focuses light emitted from an object to be imaged on the imaging device. The imaging section 50 captures an image of part of the projection surface S including an image projected thereon (hereinafter also referred to as "projected image") based on an instruction from the control section 20. The imaging section 50 then produces image information representing the image having been captured (hereinafter also referred to as "captured image") (captured image information) and outputs the captured image information to the image analysis section 51.

The image analysis section 51 includes a processor, a memory, and other components for image analysis (neither of them are shown). The image analysis section 51 analyzes the captured image information inputted from the imaging section 50. Specifically, the imaging section 50 captures a predetermined test image projected by each of the projector 100 and another projector, and the image analysis section 51 performs image analysis on the captured image to detect the position (coordinates) of the test image in the captured image. The coordinates to be detected are assumed, for example, to be the coordinates of the four corners of an image frame of the test image and the coordinates of the center of the test image. The image analysis section 51 outputs the analysis result to the control section 20.

A description will next be made of processes carried out when the projector 100 is used to achieve a multi-projection system with reference to Examples.

Example 1

A description will first be made of a multi-projection system in which two projectors are so disposed that they are stacked on each other in the vertical (up-down) direction.

Figures 3, 4A, 4B:
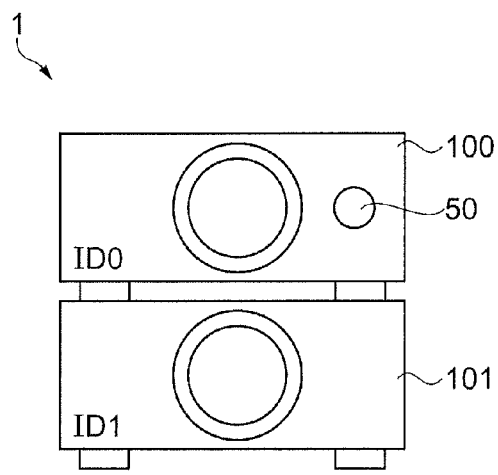
FIG. 3 is a front view showing an aspect of a multi-projection system according to Example 1.
FIGS. 4A and 4B are descriptive diagrams of a layout information database according to Example 1.

FIG. 3 is a front view showing an aspect of a multi-projection system according to Example 1.

In a multi-projection system 1, the projector 100 and a projector 101 are stacked on each other, as shown in FIG. 3. In the present embodiment, the configuration of the projector 101 differs from that of the projector 100 in that the imaging section 50 and the image analysis section 51 are omitted, but the projector 101 may instead have a configuration in which the imaging section 50 and the image analysis section 51 are provided (that is, the same configuration as that of the projector 100). The same components of the projectors therefore have the same reference characters, and no illustration is provided.

The thus arranged multi-projection system 1 can project vertically stacked images. For example, when the display pixel count of an image projected by each of the projectors 100 and 101 is 1920×1080, the multi-projection system 1 can project an image having an effective total display pixel count of 1920×2160. Specifically, the projector 100 can be responsible for projection of upper 1920×1080 pixels of the projected image, and the projector 101 can be responsible for projection of lower 1920×1080 pixels of the projected image.

The image signal outputted from the external image supply apparatus (not shown) is inputted to the image signal input section 30 of the projector 100. The image output terminal MO of the projector 100 and an image input terminal of the image signal input section 30 of the projector 101 are connected to each other via an image cable (not shown). The image signal outputted from the projector 100 is therefore inputted to the image signal input section 30 of the projector 101.

In the multi-projection system 1, when the multi-projection key provided on the operation panel 21 of the projector 100 is pressed, the projector 100 starts, as a master projector, searching another projector connected to the projector 100. To make the multi-projection system work, the projector 100 creates a layout information database representing the relative layout relationship between the projector 100 and another projector connected thereto.

FIGS. 4A and 4B are descriptive diagrams of the layout information database according to Example 1. FIG. 4A is a descriptive diagram showing an initialized state, and FIG. 4B is a descriptive diagram showing a complete state.

A layout information database DB (DB0, DB1) is a database stored in a rewritable nonvolatile memory or volatile memory provided in the control section 20. When a "layout information creation process in the multi-projection system," which will be described later, is carried out, the layout information database is initialized. At this point, the layout information database is in an initialized state, into which a relative position and other types of information are then set, and the layout information database is in a complete state. FIG. 4A shows a layout information database DB0 in the initialized state, and FIG. 4B shows a layout information database DB1 in the complete state.

In the layout information database DB (DB0, DB1) in the present example, two projectors are registered and a projector ID0 and a projector ID1 represent that the multi-projection system 1 has been established. It is assumed that the projector ID0 in the first row is a master projector, and the projector ID1 in the second row or is a slave projector. When other slave projectors are present, additional rows are created in the layout information database DB, such as a projector ID2, a projector ID3, . . . . The layout information database DB stores information on the display pixel count and a relative position on a projector ID basis.

The display pixel count represents the count of pixels displayable by each projector. The layout information database DB, when initialized, becomes, for example, the layout information database DB0 that stores the information on the display pixel count. The relative position represents the coordinates of the position of the slave projector ID1 (ID2, ID3, . . . ) with respect to the coordinates of the position of the master projector ID0, (x,y)=(0,0). The coordinate x of the coordinates of a position represents the location along the right-left direction. A positive (+) x coordinate represents a rightward position when viewed in the direction toward the projection surface S, whereas a negative (−) x coordinate represents a leftward position when viewed in the direction toward the projection surface S. The coordinate y of the coordinates of a position represents the location along the up-down direction. A positive (+) y coordinate represents an upward position, whereas a negative (−) y coordinate represents a downward position. The terms "leftward" and "rightward" represent the left and right sides of the projector 100 viewed from a position behind the projector 100.

In the present example, the coordinates of the position of the slave projector ID1 are (x,y)=(0,−1), which represents that the slave projector ID1 is disposed in a position below the master projector ID0, that is, the master projector ID0 is placed on the slave projector ID1.

The layout information database DB can thus represent the state in which the master projector ID0 and a plurality of slave projectors are arranged. Each of the symbols "ID0" and "ID1" stored in the projector ID field is identification information allocated for identifying each of the projectors, and held, for example, in the ROM in the control section 20. The identification information can be information specific to each of the projectors, such as the MAC address.

A description will next be made of a process in which the projector 100 searches another projector connected thereto and creates the layout information database DB (layout information creation process).

Figure 5:
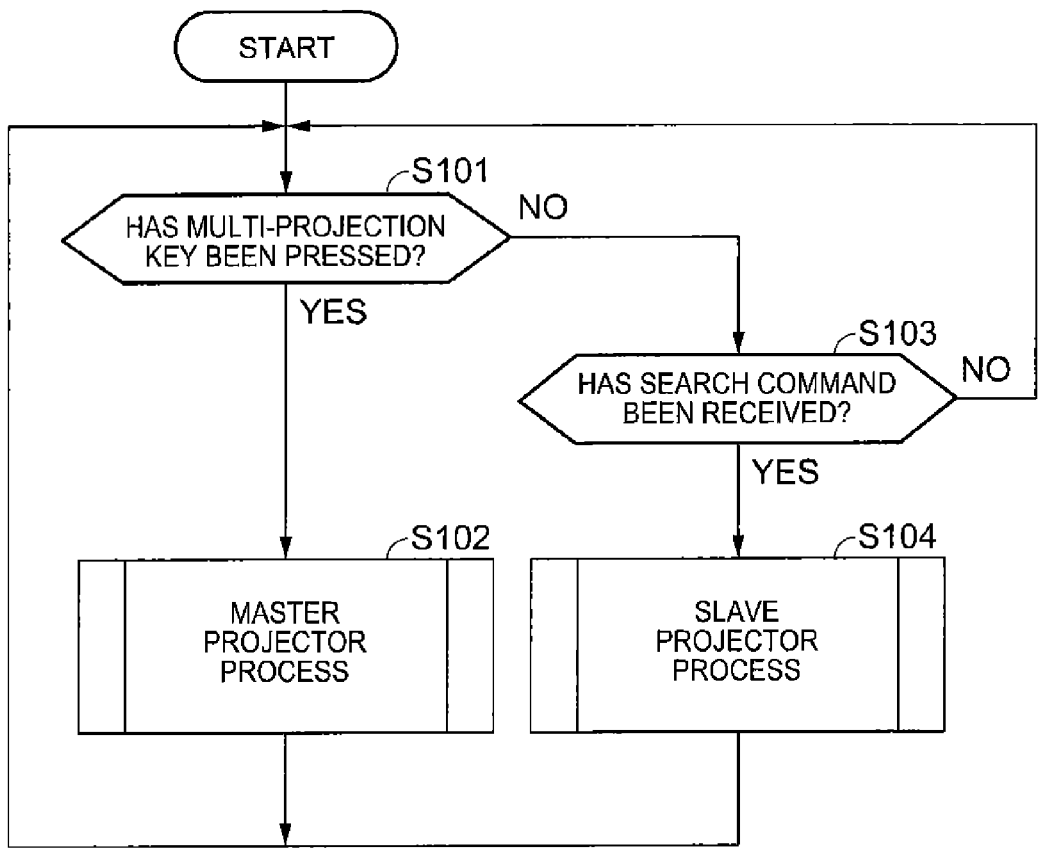
FIG. 5 is a flowchart showing a layout information creation process in the multi-projection system.

FIG. 5 is a flowchart showing the layout information creation process in the multi-projection system according to the present embodiment.

The control section 20 of the projector 100 determines whether or not the multi-projection key provided on the operation panel 21 has been pressed (step S101). When the determination result shows that the multi-projection key has been pressed (step S101: YES), the control section 20 recognizes that the projector 100 itself is the master projector and carries out a master projector process (subroutine) (step S102). When the master projector process is completed, the control returns to step S101.

When the determination result shows that the multi-projection key has not been pressed (step S101: NO), the control section 20 determines whether or not the communication section 41 has received a SEARCH command for searching a slave projector (step S103). When the determination result shows that the communication section 41 has received the SEARCH command (step S103: YES), the control section 20 recognizes that the projector 100 itself is a slave projector and carries out a slave projector process (subroutine) (step S104). When the slave projector process is completed, the control returns to step S101.

When the determination result shows that the communication section 41 has not received the SEARCH command (step S103: NO), the control returns to step S101.

The master projector process (subroutine) will next be described.

Figure 6:
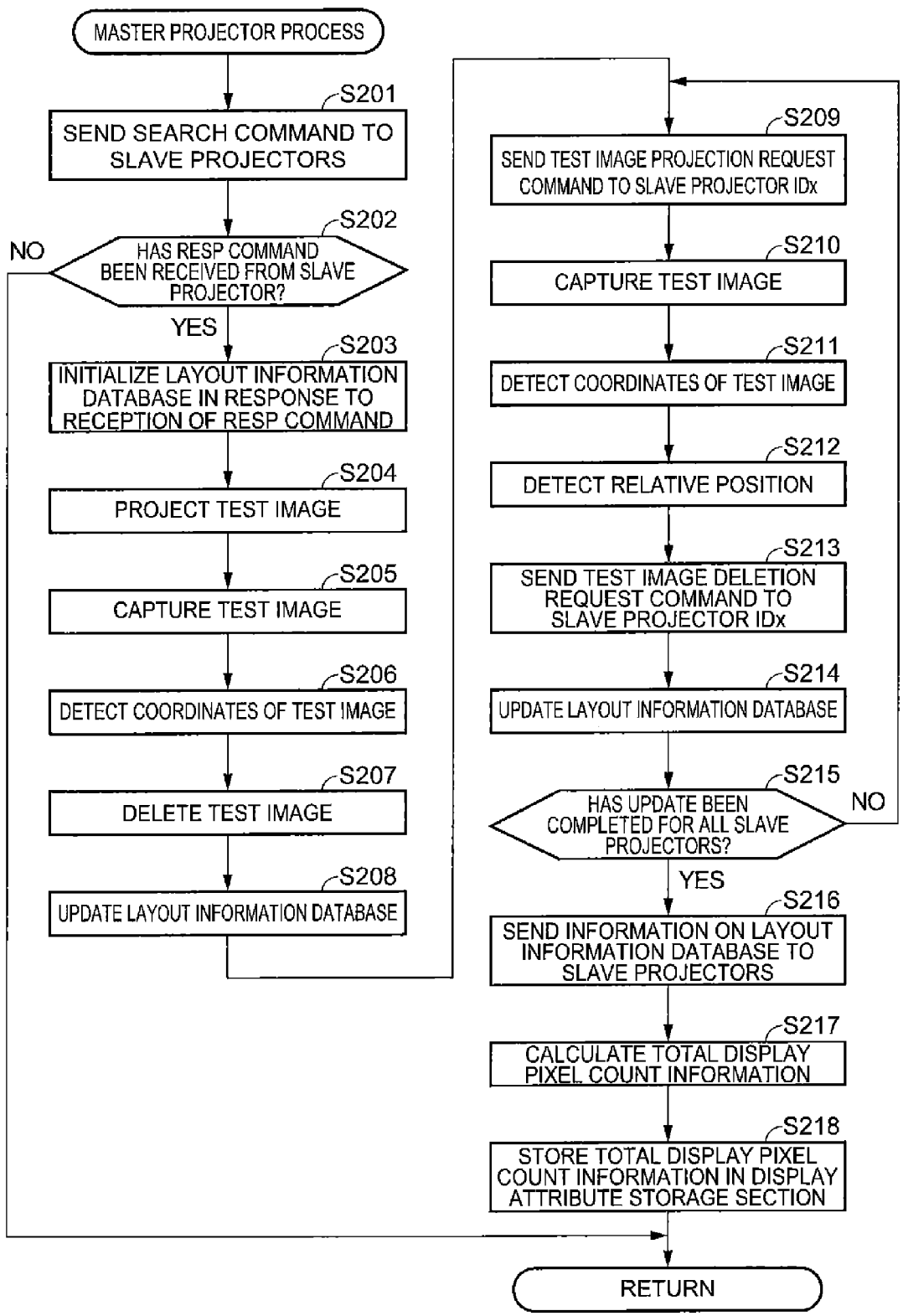
FIG. 6 is a flowchart of a master projector process.

FIG. 6 is a flowchart of the master projector process.

The control section 20 issues an instruction to the communication section 41 to cause it to send the SEARCH command to all projectors connected to the projector 100 (step S201). In this process, the projectors connected to the projector 100 are assumed to be all projectors including the projector 101 connected to the projector 100 and other projectors serially connected to the projector 101. The SEARCH command is a command for checking presence of other connected projectors. In Example 1, the SEARCH command is sent only to the projector 101.

The control section 20 then determines whether or not the communication section 41 has received a RESP (abbreviation for RESPONSE) command (step S202). The RESP command is a command sent from a projector that has received the SEARCH command in response thereto and contains the identification information (ID), the information on the display pixel count, and other types of information on the projector that has received the SEARCH command. A projector that sends the RESP command in response to the SEARCH command is a slave projector.

When the determination result shows that the communication section 41 has not received RESP command (step S202: NO), the control section 20 of the projector 100 determines that no slave projector is connected and terminates the master projector process (return).

When the determination result shows that the communication section 41 has received the RESP command (step S202: YES), the control section 20 initializes the layout information database DB in response to the reception of the RESP command (step S203). Specifically, the identification information (ID) and the information on the display pixel count for the master projector ID0 and all slave projectors from which the RESP command has been received are stored in the layout information database DB0. In Example 1, the projector 101 is recognized as the slave projector ID1 (see FIG. 4A).

The control section 20 issues an instruction to the image processing section 31 to cause the projector 100 to project a test image (step S204). The control section 20 then issues an instruction to the imaging section 50 to cause it to capture an image of the test image (step S205). The test image is a predetermined test pattern image. The test image will now be described.

Figure 7A:
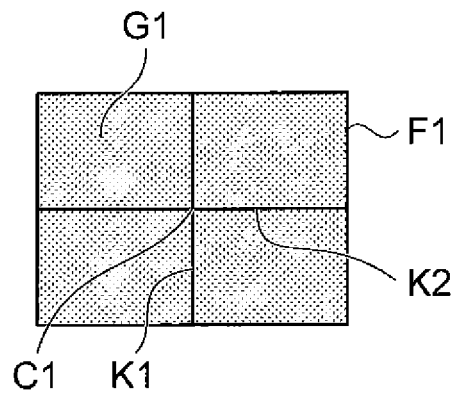
FIGS. 7A and 7B are descriptive diagrams of a test image and an imaging result.
Figure 7B:
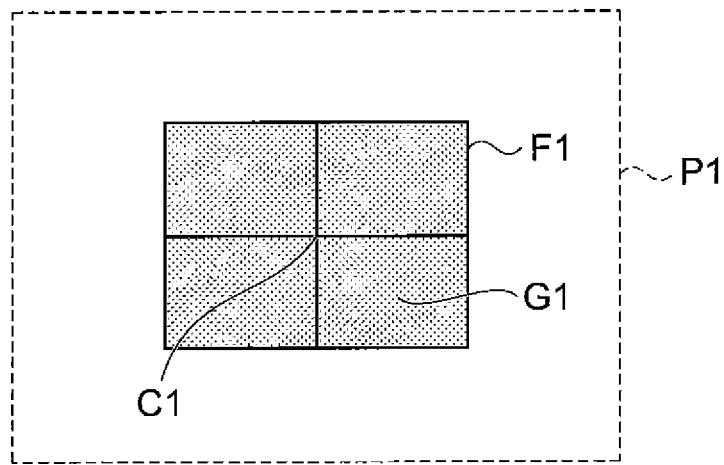

FIGS. 7A and 7B are descriptive diagrams of the test image and an imaging result. FIG. 7A is a descriptive diagram of the test image, and FIG. 7B is a descriptive diagram of the imaging result.

A test image G1 in the present embodiment shows a displayable maximum image frame F1, and the portion inside the image frame F1 is filled in gray, as shown in FIG. 7A. The test image G1 further shows a grid line K1, which passes through the center C1 of the test image G1 and extends in parallel to the vertical sides of the image frame F1, and a grid line K2, which passes through the center C1 of the test image G1 and extends in parallel to the horizontal sides of the image frame F1. The test image G1 does not necessarily have the shape described above and only needs to allow the position of the test image G1 to be recognized.

FIG. 7B shows a captured image P1 as a result of imaging of the test image G1 projected by the master projector ID0. The captured image P1 shows the test image G1 in a substantially central portion thereof.

Referring back to FIG. 6, the control section 20 issues an instruction to the image analysis section 51 to cause it to perform image analysis for detection of the coordinates of the test image G1 in the captured image P1 (step S206). As the coordinates to be detected, the coordinates of the four corners of the image frame F1 of the test image G1 and the coordinates of the center C1 of the test image G1 are detected.

The control section 20 then issues an instruction to the image processing section 31 to cause the projector 100 to delete the test image G1 (step S207). The control section 20 updates the relative position of the master projector ID0 in the layout information database DB to (x,y)=(0,0) (step S208).

The control section 20 sends a test image projection request command to a slave projector IDx via the communication section 41 (step S209). The slave projector IDx stands for each of the slave projectors stored in the layout information database DB0. In Example 1, the slave projector IDx stands for the slave projector ID1. Further, the test image projection request command corresponds to a projection request command. The slave projector IDx projects a test image in response to the test image projection request command.

The control section 20 issues an instruction to the imaging section 50 to cause it to capture an image of the test image (step S210). The imaging section 50 of the master projector ID0 captures an image of at least part of the test image projected by the slave projector IDx. In the present embodiment, it is assumed that the setting of the master projector ID0 and the slave projector IDx, specifically, adjustment of the position where a projected image is displayed, such as correction of lens shift and geometric correction of the image, is made in accordance with a default setting (initial setting).

A description will now be made of the image captured by the master projector ID0.

Figure 8:
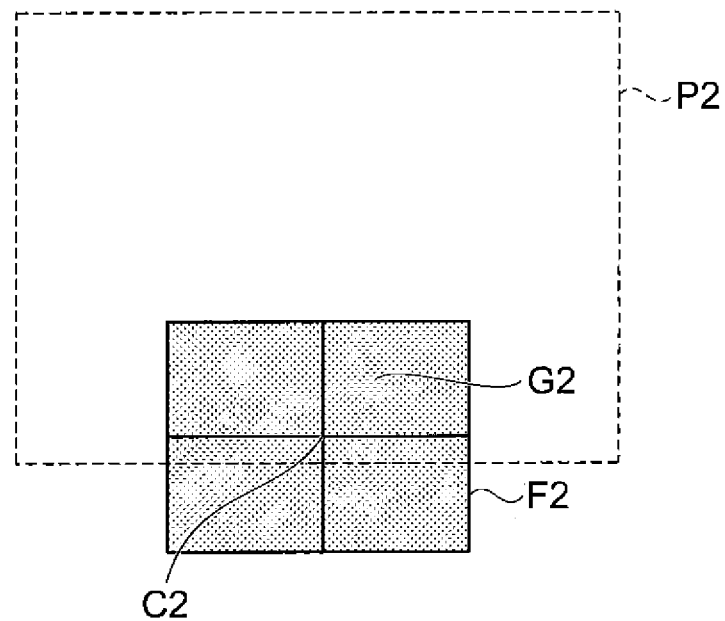
FIG. 8 is a descriptive diagram of a result of imaging of a test image projected by a slave projector according to Example 1.

FIG. 8 is a descriptive diagram of a result of imaging of the test image projected by the slave projector ID1 according to Example 1.

It is assumed that a test image G2 projected by the slave projector ID1 has the same shape as that of the test image G1 projected by the master projector ID0. FIG. 8 shows a captured image P2 as a result of imaging of the test image G2 projected by the slave projector ID1. The captured image P2 shows the test image G2 in a lower portion thereof. Although shown in FIG. 8, the portion of the test image G2 that is outside the captured image P2 is not actually captured. The test image G2 shows an image frame F2 and the center C2.

Referring back to FIG. 6, the control section 20 issues an instruction to the image analysis section 51 to cause it to perform image analysis for detection of the coordinates of the test image G2 in the captured image P2 (step S211). The coordinates to be detected are the coordinates of the four corners of the image frame F2 of the test image G2 and the coordinates of the center C2 of the test image G2.

The control section 20 detects the relative position of the test image G2 with respect to the test image G1 based on the detected coordinates (step S212). Specifically, the control section 20 compares the coordinates calculated in step S206, that is, the coordinates of the four corners of the image frame F1 of the test image G1 and the coordinates of the center C1 of the test image G1 projected by the master projector ID0 with the coordinates of the four corners of the image frame F2 of the test image G2 and the coordinates of the center C2 of the test image G2 projected by the slave projector ID1 to detect the relative position. The relative position of the test image G2 with respect to the test image G1 can be taken as the relative position of the slave projector ID1 with respect to the master projector ID0. The control section 20 that recognizes the relative position of the slave projector IDx with respect to the master projector ID0 as described above corresponds to a layout recognition section.

The relative position represents the coordinates of the position of the slave projector ID1 (ID2, . . . ) with respect to the coordinates of the position of the master projector ID0, (x,y)=(0,0). In the present embodiment, as a method for detecting the relative position of the test image G2 with respect to the test image G1, a method for detecting the relative position based on the positional relationship of the coordinates of the center C2 of the test image G2 with respect to the test image G1 is used.

Figure 9:
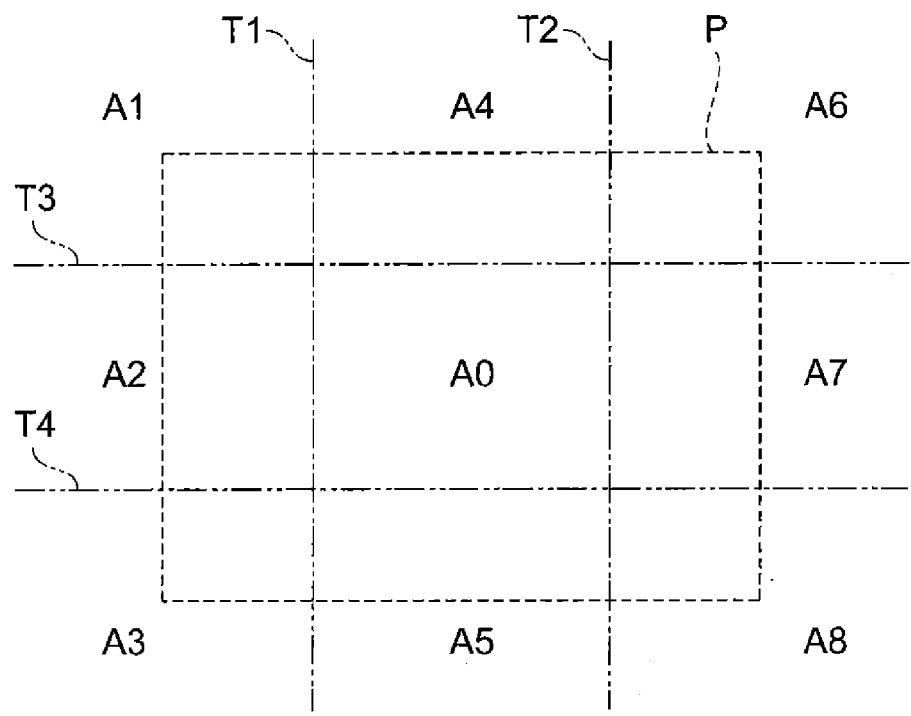
FIG. 9 is a descriptive diagram showing regions for determining a relative position.

FIG. 9 is a descriptive diagram showing regions for determining the relative position.

A captured image P captured by the master projector ID0 is divided into regions A0 and A1 to A8 by region lines T1, T2, T3, and T4, as shown in FIG. 9. The region A0 is equivalent to the image frame F1 of the test image G1 in an image captured by the master projector ID0 and containing the test image G1. The relative position of the slave projector ID1 is determined based on which of the regions A1 to A8 contains the coordinates of the center C2 of the test image G2 in an image captured by the master projector ID0 and containing the test image G2. The relative position of another slave projector IDx can be determined based on which of the regions A1 to A8 contains the coordinates of a center Cx of a test image Gx in an image captured by the master projector ID0 and containing the test image GX. The test image Gx is a test image projected by a slave projector IDx. The center Gx is the center of the test image Gx.

In Example 1, since the test image G2 projected by the slave projector ID1 is located in a position below the test image G1 projected by the master projector ID0, the coordinates of the position of the slave projector ID1 (relative position) is (x,y)=(0,-1), which means that the slave projector ID1 is disposed in a position below the master projector ID0.

Referring back to FIG. 6, the control section 20 sends a test image deletion request command to the slave projector IDx via the communication section 41 (step S213). Having received the test image deletion request command, the slave projector IDx stops projecting the test image. In Example 1, the slave projector IDx is the slave projector ID1.

The control section 20 updates the relative position of the slave projector IDx in the layout information database DB (step S214). In Example 1, the control section 20 updates the relative position of the slave projector ID1 in the layout information database DB to (x,y)=(0,-1). The control section 20 that updates and completes the layout information database DB as described above corresponds to a layout information creation section.

The control section 20 determines whether or not the update of the relative position has been completed for all slave projectors stored in the layout information database DB (step S215). When the determination result shows that the update of the relative position has not been completed for all slave projectors (step S215: NO), the control returns to step S209, where the control section 20 causes the next slave projector IDx to project the test image, captures an image of the test image, detects the relative position of the slave projector IDx, and updates the layout information database DB.

When the determination result shows that the update of the relative position has been completed for all slave projectors (step S215: YES), the control section 20 sends the completed layout information database DB1 in the form of an information command to all slave projectors (step S216). The information command is a command for sending information and data, such as the layout information database DB1 described above.

The control section 20 calculates information on the total display pixel count of an image formed by the master projector ID0 and all slave projectors IDx based on the layout information database DB1 and the display pixel count information associated with the projector 100 and stored in the display attribute storage section 22 (step S217). Specifically, the control section 20 calculates the display pixel count of an entire image (total display pixel count information) formed when images projected by the master projector ID0 and all slave projectors IDx are arranged in the form of a row and/or a column. The control section 20 that operates as described above corresponds to a total display pixel count calculation section. The control section 20 then stores the total display pixel count information in the display attribute storage section 22 (step S218). The master projection process (subroutine) is then terminated (return).

Figure 10:
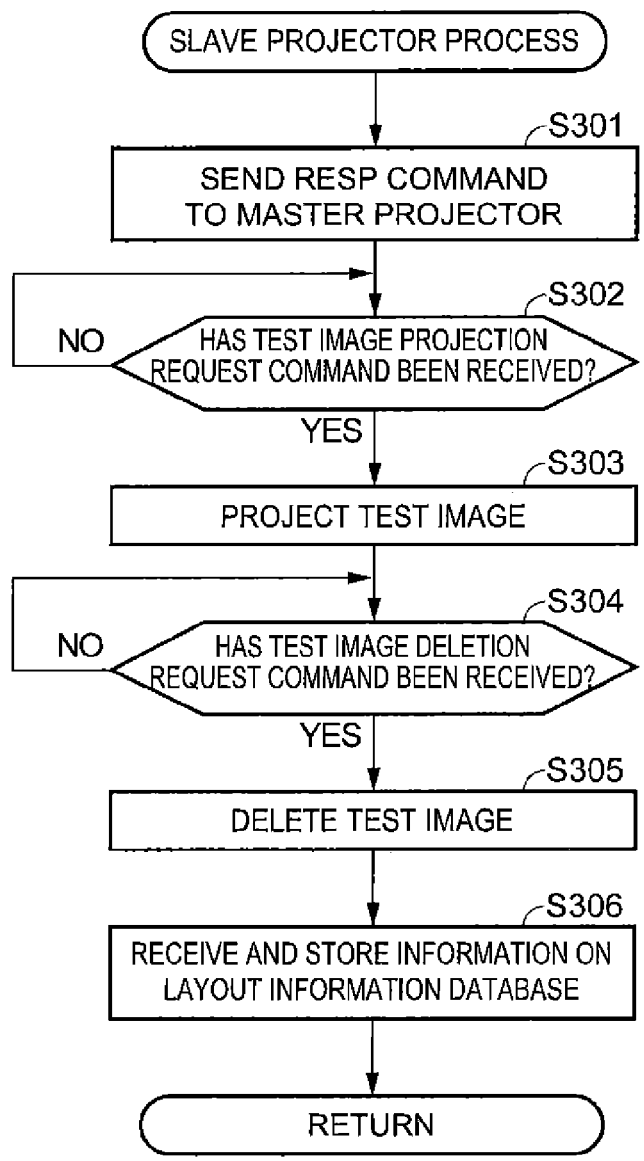
FIG. 10 is a flowchart of a slave projector process.

The slave projector process (subroutine) will next be described. In Example 1, the configuration of the projector 101, which is a slave projector IDx, differs from that of the projector 100, which is the master projector ID0, in that the imaging section 50 and the image analysis section 51 are omitted, but the projector 101 may instead have a configuration in which the imaging section 50 and the image analysis section 51 are provided, as described above. The same components of the projectors therefore have the same reference characters, and no illustration is provided. FIG. 10 is a flowchart of the slave projector process.

The control section 20 sends the RESP command via the communication section 41 to the master projector ID0 having sent the SEARCH command (step S301). The RESP command contains the identification information (ID), the information on the display pixel count, and other types of information associated with the slave projector IDx ("ID1" in Example 1).

The control section 20 then determines whether or not the test image projection request command has been received via the communication section 41 (step S302). When the determination result shows that no test image projection request command has been received (step S302: NO), the control section 20 repeats step S302 and waits for the command.

When the determination result shows that the test image projection request command has been received (step S302: YES), the control section 20 issues an instruction to the image processing section 31 to cause the projector 101 to start projecting the test image G2 (step S303). The control section 20 and the image processing section 31 that operate as described above corresponds to a test image projection control section.

The control section 20 then determines whether or not the test image deletion request command has been received via the communication section 41 (step S304). When the determination result shows that no test image deletion request command has been received (step S304: NO), the control section 20 repeats step S304 and waits for the command.

When the determination result shows that the test image delete request command has been received (step S304: YES), the control section 20 issues an instruction to the image processing section 31 to cause the projector 101 to stop projecting (delete) the test image (step S305).

The control section 20 receives the layout information database DB1 in the form of the information command via the communication section 41 and stores the received layout information database DB1 (step S306). The slave projector process (subroutine) is then terminated (return).

As described above, in the multi-projection system 1, when the layout information creation process is carried out, each of the master projector ID0 and the slave projector ID1 can recognize the information on the layout of the projectors (that is, layout information database DB1).

Example 2

A description will next be made of a multi-projection system in which projectors are disposed side by side in the horizontal direction.

Figure 11:
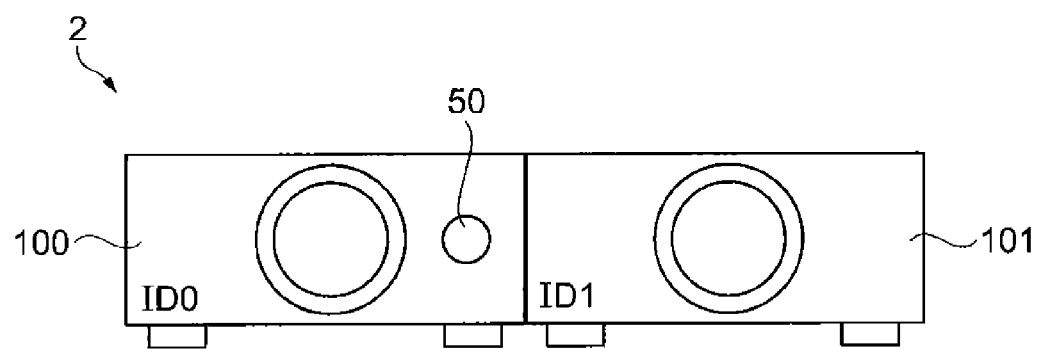
FIG. 11 is a front view showing an aspect of a multi-projection system according to Example 2.

FIG. 11 is a front view showing an aspect of a multi-projection system according to Example 2.

In a multi-projection system 2, the projector 100 and the projector 101 are disposed side by side in the horizontal (right-left) direction, as shown in FIG. 11.

In the multi-projection system 2, the communication section 41 of the projector 100 is connected to the communication section 41 of the projector 101, for example, via a USB cable (not shown). In the thus arranged multi-projection system 2, images can be projected side by side in the horizontal direction. For example, when the display pixel count of an image projected by each of the projectors 100 and 101 is 1920×1080, the multi-projection system 2 can project an image having an effective total display pixel count of 3840×1080. Specifically, the projector 100 can be responsible for projection of right 1920×1080 pixels of the projected image, and the projector 101 can be responsible for projection of left 1920×1080 pixels of the projected image.

In the multi-projection system 2 according to the present example, an image signal outputted from an external image supply apparatus is inputted to the image signal input section 30 of the projector 100. The image output terminal MO of the projector 100 and the image input terminal of the image signal input section 30 of the projector 101 are connected to each other via an image cable (not shown). The image signal outputted from the projector 100 is therefore inputted to the image signal input section 30 of the projector 101.

In the multi-projection system 2, when the multi-projection key provided on the operation panel 21 of the projector 100 is pressed, the projector 100 starts, as the master projector ID0, searching another projector connected to the projector 100 and creates the layout information.

Figure 12A:
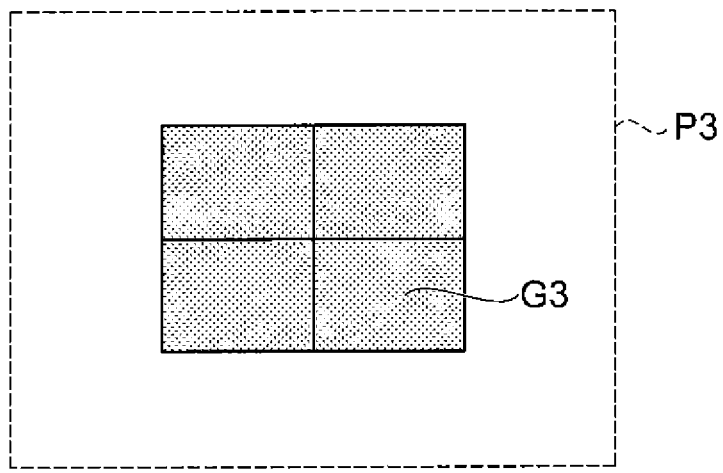
FIGS. 12A and 12B are descriptive diagrams of results of imaging of test images according to Example 2.
Figure 12B:
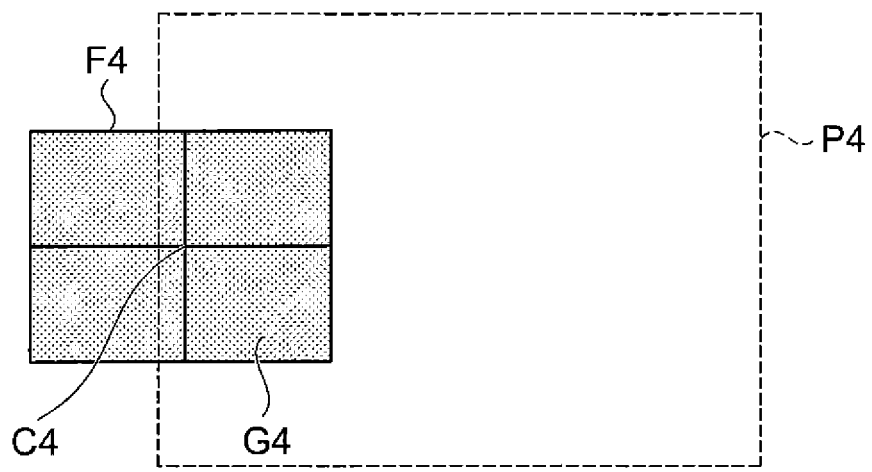

The layout information creation process in the multi-projection system 2 is the same as the process shown in FIG. 5. A description will next be made of a captured image captured by the master projector ID0 in the layout information creation process in the multi-projection system 2. FIGS. 12A and 12B are descriptive diagrams of results of imaging of test images according to Example 2. FIG. 12A is a descriptive diagram of a result of imaging of a test image projected by the master projector ID0, and FIG. 12B is a descriptive diagram of a result of imaging of a test image projected by the slave projector ID1.

As shown in FIG. 12A, a captured image P3 of a test image G3 projected by the master projector ID0 is the same as the captured image P1 shown in FIG. 7B. FIG. 12B shows a captured image P4 of a test image G4 projected by the slave projector ID1. The captured image P4 shows the test image G4 in a left portion thereof. Although shown in FIG. 12B, the portion of the test image G4 that is outside the captured image P4 is not actually captured. The test image G4 shows an image frame F4 and the center C4.

The master projector ID0 performs image analysis to detect the coordinates of the test image G4 in the captured image P4. The master projector ID0 then detects the relative position of the test image G4 with respect to the test image G3 based on the detected coordinates. Specifically, the relative position is detected by determining which of the regions A1 to A8 shown in FIG. 9 contains the center C4 of the test image G4. The relative position of the test image G4 with respect to the test image G3 can be taken as the relative position of the slave projector ID1 with respect to the master projector ID0.

The master projector ID0 updates the layout information database DB. A description will now be made of the layout information database DB in the present example.

FIG. 13 is a descriptive diagram of a layout information database DB2 according to Example 2.

The relative position of the slave projector ID1 is (x,y)= (−1,0), as shown in FIG. 13. The master projector ID0 then sends the layout information database DB2 in the form of the information command to the slave projector ID1.

As described above, in the multi-projection system 2, when the layout information creation process is carried out, each of the master projector ID0 and the slave projector ID1 can recognize the information on the layout of the projectors (that is, layout information database DB2).

Example 3

A description will next be made of a multi-projection system in which projectors are disposed in two vertical columns and two horizontal rows.

Figure 14:
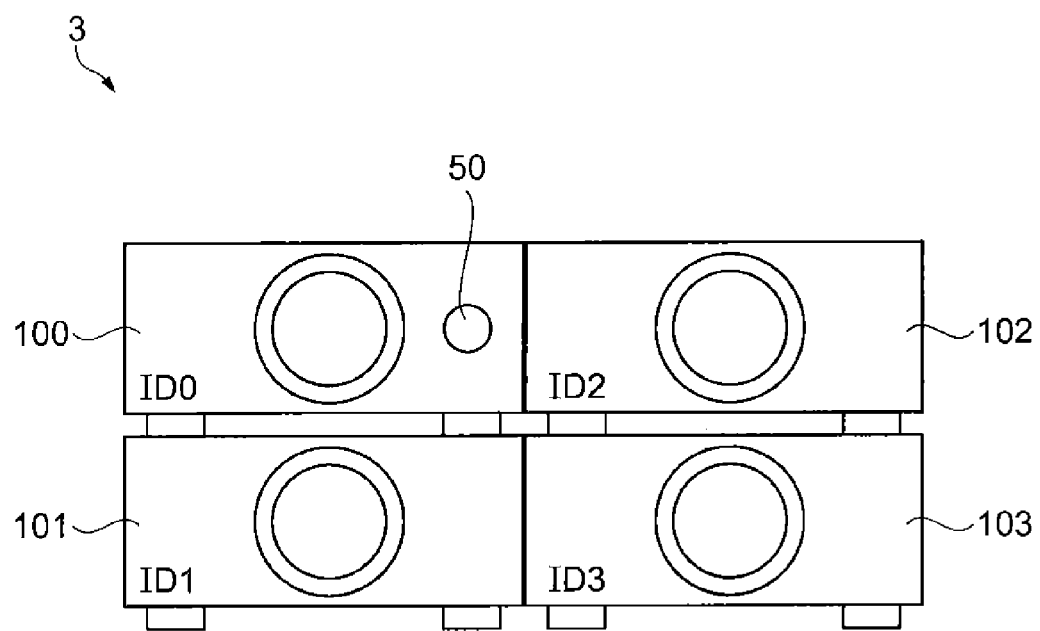
FIG. 14 is a front view showing an aspect of a multi-projection system according to Example 3.

FIG. 14 is a front view showing an aspect of a multi-projection system according to Example 3.

In a multi-projection system 3, the projector 100, the projector 101, a projector 102, and a projector 103 are disposed in two vertical columns and two horizontal rows, as shown in FIG. 14.

The configuration of each of the projectors 101, 102, and 103 differs from that of the projector 100 in that the imaging section 50 and the image analysis section 51 are omitted, but each of the projectors 101, 102, and 103 may instead have a configuration in which the imaging section 50 and the image analysis section 51 are provided. The same components of the projectors therefore have the same reference characters, and no illustration is provided.

In the multi-projection system 3, the communication section 41 of the projector 100 is connected to the communication section 41 of the projector 101, for example, via a USB cable (not shown). Further, the communication section 41 of the projector 101 is connected to the communication section 41 of the projector 102, for example, via a USE cable (not shown). Still further, the communication section 41 of the projector 102 is connected to the communication section 41 of the projector 103, for example, via a USB cable (not shown).

The thus arranged multi-projection system 3 can project four images in rows and columns. For example, when the display pixel count of an image projected by each of the projectors 100, 101, 102, and 103 is 1920×1080, the multi-projection system 3 can project an image having an effective total display pixel count of 3840×2160. Specifically, the projector 100 can be responsible for projection of upper right 1920×1080 pixels of the projected image, the projector 101 can be responsible for projection of lower right 1920× 1080 pixels of the projected image, the projector 102 can be responsible for projection of upper left 1920×1080 pixels of the projected image, and the projector 103 can be responsible for projection of lower left 1920×1080 pixels of the projected image.

In the multi-projection system 3 according to Example 3, an image signal outputted from an external image supply apparatus (not shown) is inputted to the image signal input section 30 of the projector 100. The image output terminal MO of the projector 100 and the image input terminal of the image signal input section 30 of the projector 101 are connected to each other via an image cable (not shown). Further, the image output terminal MO of the projector 101 and the image input terminal of the image signal input section 30 of the projector 102 are connected to each other via an image cable (not shown). Still further, the image output terminal MO of the projector 102 and the image input terminal of the image signal input section 30 of the projector 103 are connected to each other via an image cable (not shown). The image signal inputted to the projector 100 can therefore be inputted to the projectors 101, 102, and 103.

In the multi-projection system 3, when the multi-projection key provided on the operation panel 21 of the projector 100 is pressed, the projector 100 starts, as the master projector ID0, searching another projector connected to the projector 100 and creates the layout information.

Figure 15A:
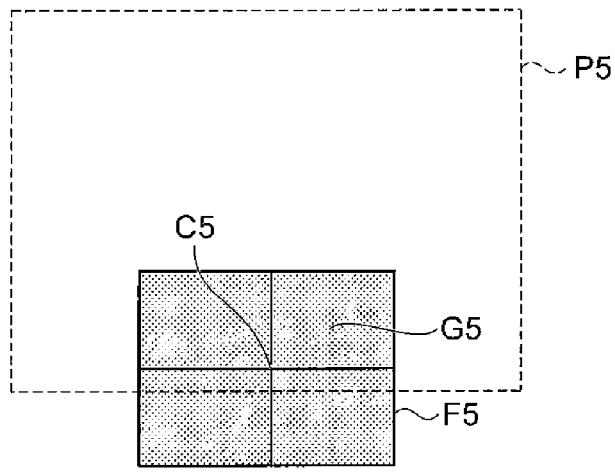
FIGS. 15A to 15C are descriptive diagrams of results of imaging of test images captured by a master projector according to Example 3.
Figure 15B:
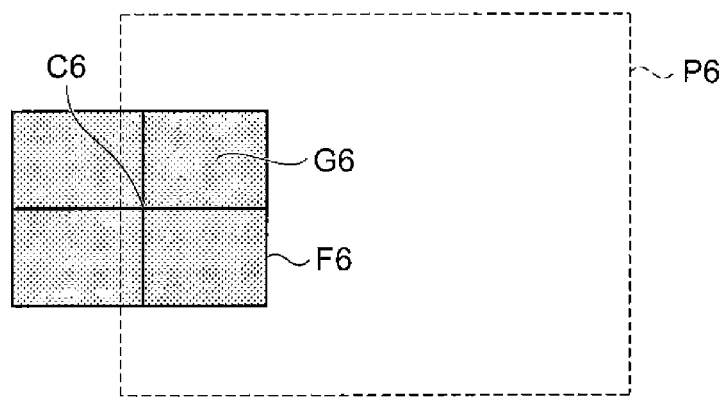
Figure 15C:
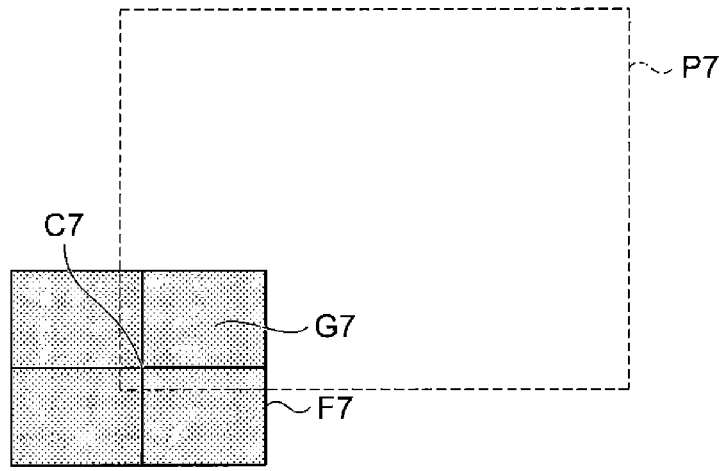

The layout information creation process in the multi-projection system 3 is the same as the process shown in FIG. 5. A description will next be made of a captured image captured by the master projector ID0 in the layout information creation process in the multi-projection system 3. FIGS. 15A to 15C are descriptive diagrams of results of imaging of test images captured by the master projector ID0 according to Example 3. FIG. 15A is a descriptive diagram of a result of imaging of a test image projected by the slave projector ID1. FIG. 15B is a descriptive diagram of a result of imaging of a test image projected by the slave projector ID2. FIG. 15C is a descriptive diagram of a result of imaging of a test image projected by the slave projector ID3.

As shown in FIG. 15A, a captured image P5 of a test image G5 projected by the slave projector ID1 is the same as the captured image P2 shown in FIG. 8. A captured image P6 of a test image G6 projected by the slave projector ID2 shown in FIG. 15B is the same as the captured image P4 shown in FIG. 12B. A captured image P7 of a test image G7 projected by the slave projector ID3 shown in FIG. 15C shows the test image G7 in a lower left portion of the captured image P7.

The master projector ID0 performs image analysis to detect the coordinates of the test image G5 in the captured image P5. The master projector ID0 then detects the relative position of the test image G5 based on the detected coordinates. Specifically, the relative position is detected by determining which of the regions A1 to A8 shown in FIG. 9 contains the center C5 of the test image G5. The relative position of the test image G5 is taken as the relative position of the slave projector ID1 with respect to the master projector ID0. The master projector ID0 then updates the layout information database DB.

Similarly, the master projector ID0 detects the coordinates of the test images G6 and G7 in the captured images P6 and P7. The master projector ID0 then detects the relative positions of the test images G6 and G7 based on the detected coordinates. Specifically, the relative positions are detected by determining which two of the regions A1 to A8 shown in FIG. 9 contain the centers C6 and C7 of the test images G6 and G7. The relative positions of the test images G6 and G7 are taken as the relative positions of the slave projectors ID2 and ID3 with respect to the master projector ID0. The master projector ID0 then updates the layout information database DB.

A description will now be made of a layout information database DB3 in the present example.

FIG. 16 is a descriptive diagram of the layout information database DB3 according to Example 3.

As shown in FIG. 16, the relative position of the slave projector ID1 is (x,y)=(0,−1). The relative position of the slave projector ID2 is (x,y)=(−1,0). The relative position of the slave projector ID3 is (x,y)=(−1,−1). The master projector ID0 then sends the layout information database DB3 in the form of the information command to the slave projectors ID1, ID2, and ID3.

As described above, in the multi-projection system 3, when the layout information creation process is carried out, each of the master projector ID0 and the slave projectors ID1, ID2, and ID3 can recognize the information on the layout of the projectors (that is, layout information database DB3).

The embodiment described above (Examples 1, 2, and 3) provides the following advantageous effects.

(1) When the multi-projection key provided on the operation panel 21 of the projector 100 is pressed, the projector 100 carries out, as the master projector ID0, the master projector process. In the master projector process, the projector 100 sends the SEARCH command to another projector connected to the projector 100 and detects whether or not a slave projector is connected to the projector 100. Having received the SEARCH command, the projectors 101, 102, and 103 carry out, as the slave projectors ID1, ID2, and ID3, the slave projector process. In the slave projector process, in response to the SEARCH command, each of the projectors 101, 102, and 103 sends the RESP command containing the identification information (ID) and the information on the display pixel count associated with the projector to the master projector ID0. The master projector ID0 can thus create the layout information database DB (initialized state) containing the slave projectors IDx. The master projector ID0 can then check the layout relationship (relative positions) among the connected slave projectors IDx based on the layout information database DB.

(2) Based on the layout information database DB, the master projector ID0 sequentially causes the slave projectors IDx to project a test image Gx and uses the imaging section 50 to capture the test image. The master projector ID0 performs image analysis on each of the captured images to detect the coordinates of the test image Gx. The master projector ID0 then detects the relative position of each of the slave projectors IDx based on the coordinates of the test image Gx. The master projector ID0 then updates the layout information database DB. The master projector ID0 can thus recognize the relative layout relationship among all the connected projectors with respect to each other, and each of the projectors can recognize a projection region for which the projector is responsible. That is, in an inputted image (image signal), each of the projectors can advantageously figure out the range for which the projector is responsible (projection region) and can project an image accordingly.

(3) The master projector ID0 attaches the layout information database DB to the information command and sends the resultant information command to the slave projectors IDx. As a result, all the slave projectors IDx can recognize the layout relationship among the projectors, and each of the slave projectors IDx can recognize its position in the layout. All the projectors connected to the multi-projection system 1, 2, or 3 can therefore recognize their positions in the layout, and each of the projectors can figure out the range for which the projector is responsible (projection region) in an inputted image (image signal) in image projection operation. That is, each of the projectors can advantageously extract an image signal corresponding to the projection region of the projector from an inputted entire image signal and project an image corresponding to the extracted image signal.

(4) In the master projector process, the projector 100 calculates, based on the display pixel count information and the layout information associated with the projectors 100, 101, 102, and 103, the total display pixel count information on the count of pixels of an image formed by all the projectors. The projector 100 then stores the total display pixel count information in the display attribute storage section 22. The total display pixel count information stored in the display attribute storage section 22 of the master projector ID0 can be referred to from an external image supply apparatus. The image supply apparatus can therefore advantageously refer to the total pixel display pixel count information associated with the multi-projection system 1, 2, or 3 to produce an image according to the total display pixel count information and supply the image to the master projector ID0 in the multi-projection system 1, 2, or 3.

(5) The projector 100 operates as the master projector ID0 when the multi-projection key is pressed, whereas the projector 100 operates as a slave projector IDx when the projector 100 receives the SEARCH command. Since the projector 100 can operate as either the master projector ID0 or a slave projector IDx as described above, a multi-projection system is established with improved convenience. Further, each of the projectors 101, 102, and 103, when configured to include the imaging section 50 and the image analysis section 51 as the projector 100 does, can operate as the master projector ID0 or a slave projector IDx, whereby a multi-projection system is established with improved convenience.

The embodiment described above is not necessarily employed, and a variety of changes, improvement, and other modifications can be made thereto for implementation. Variations of the embodiment follow.

Variation 1

In the embodiment described above, the image supply apparatus (not shown) produces an entire image (entire image signal) based on the total display pixel count information stored in the display attribute storage section 22 of the master projector ID0 and supplies the produced image to the master projector ID0. The image output terminal MO of the master projector ID0 is connected to the image signal input section 30 of the slave projector ID1. Similarly, each of the slave projectors ID2 and ID3 is serially connected to the upstream projector and receives the image signal inputted therefrom. Instead, the image supply apparatus may separately supply the image signal to the master projector ID0 and the slave projectors ID1, ID2, and ID3. That is, the image supply apparatus and the projectors may be connected in parallel to each other. In this case, the image supply apparatus may acquire the following information from each of the projectors or the master projector: the display pixel count information associated with the projector; and the information representing the position of the projector recognized by the projector based on the layout information database, and the image supply apparatus may then supply each of the projectors with an image signal representing an image within a range for which the projector is responsible (projection region) in image projection operation.

Variation 2

In the embodiment described above, the following examples have been shown: the multi-projection systems 1 and 2, each of which is formed of the two projectors 100 and 101; and the multi-projection system 3, which is formed of the four projectors 100, 101, 102, and 103. The number and layout of projectors that form a multi-projection system is not limited to those described above. The number of projectors that form a multi-projection system only needs to be plural, and a variety of layout aspects can be employed.

Variation 3

In the embodiment described above, the captured image P is divided into the region A0 and the regions A1 to A8. The relative position of a slave projector IDx is determined based on which of regions A1 to A8 contains the coordinates of the center Cx of the test image Gx. The method for determining the relative position of a slave projector IDx is not limited thereto. For example, the area of the test image Gx in each of the regions A1 to A8 may be calculated, and the relative position of a slave projector IDx may be determined based on the proportions of the calculated areas in the regions.

Variation 4

In the embodiment described above, the captured image P is divided into the region A0 and the regions A1 to A8. The region A0 is equivalent to the image frame F1 of the test image G1 in an image captured by the master projector ID0 and containing the test image G1, but the region A0 is not limited to the region described above. For example, the region A0 may be a region smaller than the image frame F1 of the test image G1.

Variation 5

In the embodiment described above, the communication sections 41 of the projectors 100, 101, 102, and 103 are serially connected to each other via USB cables as a predetermined communication device, but serial connection is not necessarily employed and any connection that allows a variety of commands to be sent and received can be employed.

Variation 6

In the embodiment described above, the light source apparatus 11 is formed of the discharge-type light source lamp 11a but can instead be formed of an LED (light emitting diode) light source, a laser or any other solid-state light source, or any other type of light source.

Variation 7

In the embodiment described above, each of the projectors 100, 101, 102, and 103 uses the transmissive liquid crystal light valves 12R, 12G, and 12B, that is, liquid crystal panels as the light modulators but can instead use reflective liquid crystal light valves or other reflective light modulators. Further, a micromirror array device that controls the incident light exiting direction for each micromirror that serves as a pixel to modulate light emitted from a light source or any other similar device can instead be used.

What is claimed is:

1. A projector that projects an image, the projector comprising:
    a pixel count storage section that stores first display pixel count information representing a count of pixels displayed by the projector;
    a communication section that sends a projection request command requesting another projector connected to the projector to project a test image, and receives second display pixel count information representing a count of pixels displayed by the other projector from the other projector;
    an imaging section that captures an image of the test image projected by the other projector in response to the projection request command;
    a layout recognition section that recognizes a relative layout relationship between the projector and the other projector based on the image captured by the imaging section;
    a layout information creation section that creates layout information representing the relative layout relationship based on the relative layout relationship; and
    a total display pixel count calculation section that calculates total display pixel count information representing a count of pixels displayed in an entire image formed by the projector and the other projector based on the first display pixel count information, the second display pixel count information, and the layout information.

2. The projector according to claim 1, further comprising a total display pixel count storage section that stores the layout information and the total display pixel count information,
    wherein the total display pixel count storage section is configured to be referred to from an apparatus outside the projector.

3. The projector according to claim 1, further comprising
a test image projection control section that controls the projector to project the test image in response to the projection request command in a case where the communication section receives the projection request command.

4. A multi-projection system comprising:
the projector according to claim 1, and
the other projector.

5. The projector according to claim 1, further comprising
an image projector that projects an image based on the layout information,
wherein the communication section sends the layout information to the other projector using a wireless or wired communicator.

6. A method for controlling a projector that projects an image, the method comprising:
storing first display pixel count information representing a count of pixels displayed by the projector;
sending a projection request command requesting another projector connected to the projector to project a test image;
receiving from the other projector second display pixel count information representing a count of pixels displayed by the other projector;
capturing an image of the test image projected by the other projector in response to the projection request command;
recognizing a relative layout relationship between the projector and the other projector based on the image captured in the capturing;
creating layout information representing the relative layout relationship based on the relative layout relationship; and
calculating total display pixel count information representing a count of pixels displayed in an entire image formed by the projector and the other projector based on the first display pixel count information, the second display pixel count information, and the layout information.

7. The method for controlling a projector according to claim 6, further comprising
storing the layout information and the total display pixel count information in such a way that the layout information and the total display pixel count information can be referred to from an apparatus outside the projector.

8. The method for controlling a projector according to claim 6, further comprising
projecting the test image in response to the projection request command in a case where the projection request command is received.

9. The method for controlling a projector according to claim 6, further comprising
sending, using a wireless or wired communicator, the layout information to the other projector; and
projecting an image based on the layout information.

* * * * *